United States Patent
Oroskar et al.

(10) Patent No.: US 8,412,204 B1
(45) Date of Patent: Apr. 2, 2013

(54) ELEVATION-BASED CONTROL OF A WIRELESS COMMUNICATION DEVICE

(75) Inventors: Siddharth S. Oroskar, Overland Park, KS (US); Sachin R. Vargantwar, Overland Park, KS (US); Anoop Kumar Goyal, Overland Park, KS (US); Manoj Shetty, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 168 days.

(21) Appl. No.: 13/025,263

(22) Filed: Feb. 11, 2011

(51) Int. Cl.
*H04W 36/00* (2009.01)
(52) U.S. Cl. ............ 455/440; 455/404.2; 455/436; 455/437; 455/452.2; 455/456.1; 455/456.5; 455/456.6
(58) Field of Classification Search .............. None
See application file for complete search history.

(56) References Cited

U.S. PATENT DOCUMENTS

| | | | |
|---|---|---|---|
| 5,940,768 A | 8/1999 | Thro et al. | |
| 6,608,593 B2 | 8/2003 | Holt | |
| 6,999,780 B1* | 2/2006 | Zhao | 455/456.1 |
| 7,019,693 B2 | 3/2006 | Spirito | |
| 2001/0055969 A1* | 12/2001 | Bonta et al. | 455/436 |
| 2005/0153705 A1* | 7/2005 | Gramakov et al. | 455/456.1 |
| 2006/0262731 A1 | 11/2006 | Carlson et al. | |
| 2007/0103363 A1 | 5/2007 | Boiero et al. | |
| 2008/0159226 A1* | 7/2008 | He et al. | 370/331 |
| 2010/0029276 A1* | 2/2010 | Hwang | 455/436 |
| 2010/0142489 A1* | 6/2010 | Qi | 370/332 |

* cited by examiner

*Primary Examiner* — Rafael Pérez-Gutiérrez
*Assistant Examiner* — Suhail Khan (57) ABSTRACT

A wireless communication device determines a latitude indicator, longitude indicator, and received signal strength for its current location. The devices processes the latitude indicator, longitude indicator, and received signal strength to estimate its elevation at the location. The device also processes its handover history to determine a handover probability factor. The device then processes the estimated elevation and handover probability factor to estimate if the device is located in a building above an elevation level. If the estimate indicates that the device is located within the building above the elevation level, then the device modifies a handover parameter to inhibit handover attempts.

20 Claims, 6 Drawing Sheets

ELEVATION-BASED CONTROL OF A WIRELESS COMMUNICATION DEVICE

TECHNICAL BACKGROUND

Wireless communication devices exchange wireless signals over the air with wireless access nodes. The wireless access nodes provide access to various communication services, such as web browsing, voice calling, text messaging, and the like. The exchange of wireless signals is affected by the structural environment inhabited by the wireless communication device and the wireless access nodes.

A wireless communication device that is located on the ground in a downtown area must communicate through various buildings and structures—referred to as ground clutter. If the wireless communication device moves to the upper floors of a tall building, then it no longer communicates through as much ground clutter. Thus, a wireless communication device typically has a better wireless signal strength at the top of a building as opposed to the bottom of the building. Since signal strength correlates to elevation, the received signal strength can be used to estimate the elevation at a given location.

OVERVIEW

A wireless communication device determines a latitude indicator, longitude indicator, and received signal strength for its current location. The devices processes the latitude indicator, longitude indicator, and received signal strength to estimate its elevation at the location. The device also processes its handover history to determine a handover probability factor. The device then processes the estimated elevation and handover probability factor to estimate if the device is located in a building above an elevation level. If the estimate indicates that the device is located within the building above the elevation level, then the device modifies a handover parameter to inhibit handover attempts.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
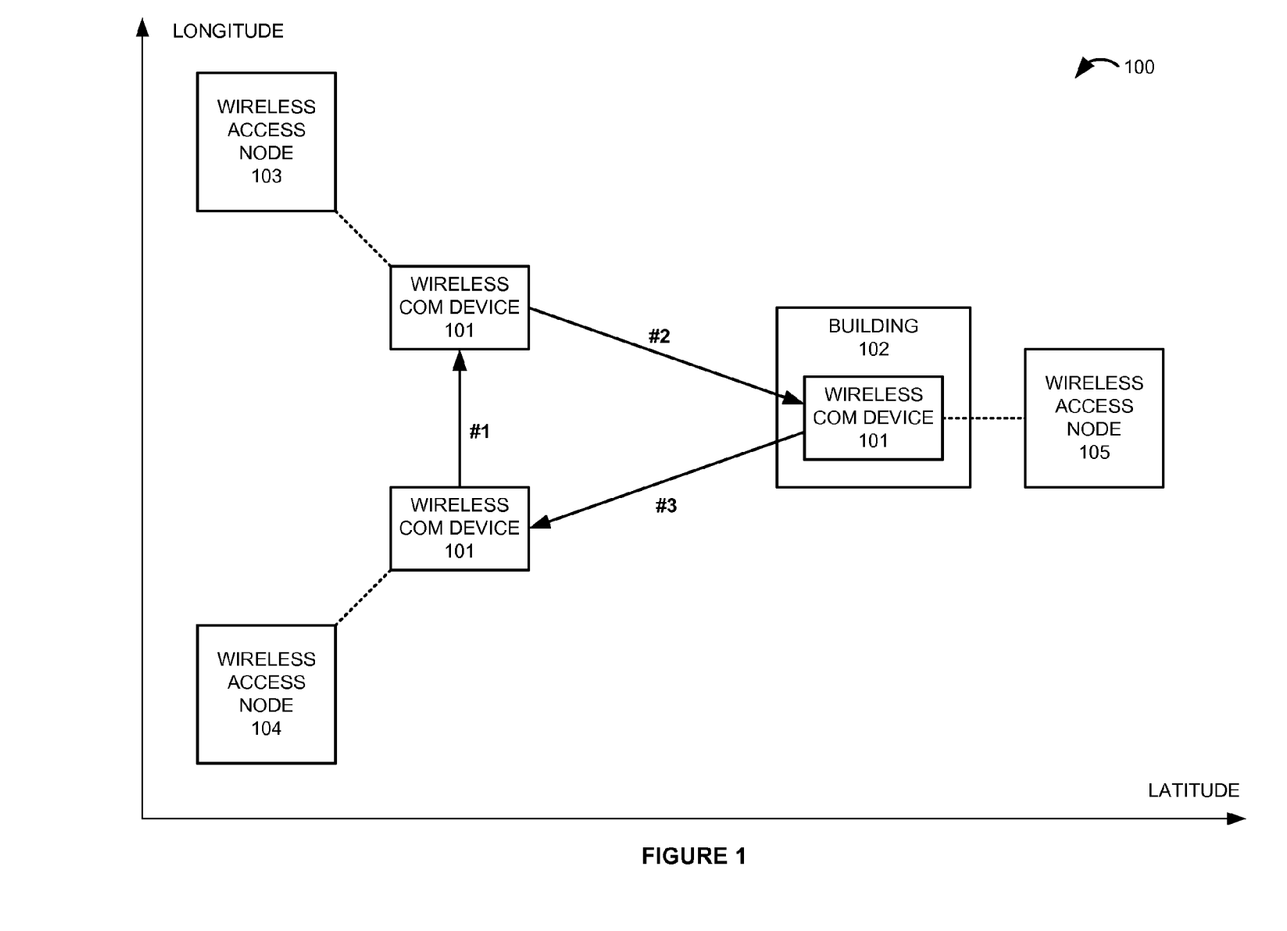
FIG. 1 illustrates an area view of a communication system having a wireless communication device that is controlled based on elevation.

FIG. 1 illustrates an area view of communication system 100. Note that the area is characterized by a longitude axis and a latitude axis. Communication system 100 includes wireless communication device 101, building 102, and wireless access nodes 103-105. Wireless communication device 101 might be a telephone, computer, e-book, game console, Internet appliance, wireless network interface card, media player, or some other wireless communication apparatus—including combinations thereof. Wireless communication device 101 and wireless access nodes 103-105 are in communication over wireless communication links that are represented by dotted lines. Three movements of wireless communication device 101 are indicated by corresponding numbered arrows 1-3.

Prior to the first movement, wireless communication device 101 is in wireless communication with wireless access node 104 (although device 101 may still scan for pilot signals from other wireless access nodes). During the first movement, wireless communication device 101 initiates a handover from wireless access node 104 to wireless access node 103—typically based on comparative signal strength. After the first movement and prior to the second movement, wireless communication device 101 is in wireless communication with wireless access node 103.

During the second movement, wireless communication device 101 initiates a handover from wireless access node 103 to wireless access node 105—typically based on comparative signal strength. Additional operations of wireless communication device 101 that are related to reaching an elevation level in building 102 are discussed further below. After the second movement and prior to the third movement, wireless communication device 101 is in wireless communication with wireless access node 105. During the third movement, wireless communication device 101 initiates a handover from wireless access node 105 to wireless access node 104—typically based on comparative signal strength. After the third movement, wireless communication device 101 is again in wireless communication with wireless access node 104.

During these movements, wireless communication device 101 determines latitude indicator and longitude indicators for its current location. Various location techniques could be used, such as radio triangulation by signal strength and/or round trip delay, Global Position Satellite (GPS) signal processing, position beacon signal processing, or some other location-determination technique. The indicators could be geophysical coordinates, coordinate ranges, or some other information that corresponds to the current latitude/longitude of wireless communication device 101.

During the movements, wireless communication device 101 also determines received signal strength for its current location. The received signal strength could be measured by received signal power, signal-to-noise ratio, or some other metric that corresponds to the received signal strength. Wireless communication device 101 processes the latitude indicators, the longitude indicators, and the received signal strength to estimate its current elevation. Although various techniques could be used, wireless communication device 101 may enter a data structure with the latitude and longitude indicators to access translation data that correlates signal strength to elevation for that location. Wireless communication device 101 would process the received signal strength against the translation data to yield the estimated elevation.

Wireless communication device 101 also tracks its handover history to determine a handover probability factor—the likelihood that device 101 is about to experience a handover. In some examples, wireless communication device 101 sets the handover probability factor to "yes" after a handover, since device 100 is typically mobile during a handover. Wireless communication device 101 monitors the time since the handover, and when a time period elapses without another handover, wireless communication device 101 sets the handover probability factor to "no." Other data could also be considered to determine handover probability, such as a pattern of past handovers correlated to time, accelerometer and compass data, network data, or some other information that indicates handover probability.

Wireless communication device 101 processes the estimated elevation and the handover probability factor to estimate if the wireless communication device 101 is located in a building above an elevation level. Typically, this entails identifying that wireless communication device 101 is above a specific elevation level at the location, and then waiting for the handover probability to go negative—indicating that that wireless communication device 101 is relatively stationary at the elevation level. In other words, wireless communication device 101 identifies a device status that correlates to remaining in the upper floors of a building.

If wireless communication device 101 estimates that it is located within a building above its elevation level, then device 101 modifies a handover parameter to inhibit a handover attempt away from wireless access node 105. In some examples, wireless communication device 101 increases the signal strength difference that is required for a handover from wireless access node 105 and to another wireless access node. In some examples, wireless communication device 101 increases a time delay that is required before a handover is attempted from wireless access node 105 and to another wireless access node. In some examples, wireless communication device 101 increases a time period between the periodic scans for other wireless access nodes.

Upon egress from building 102, a reciprocal process occurs. Wireless communication device 101 estimates that its elevation is below the specified elevation level for the location indicating that the above condition no longer applies. In response, wireless communication device 101 removes the handover inhibition. In some examples, wireless communication device 101 decreases the signal strength difference that is required for a handover attempt. In some examples, wireless communication device 101 decreases the time delay that is required before a handover attempt. In some examples, wireless communication device 101 decreases the time period between scans for other wireless access nodes.

Figure 2:
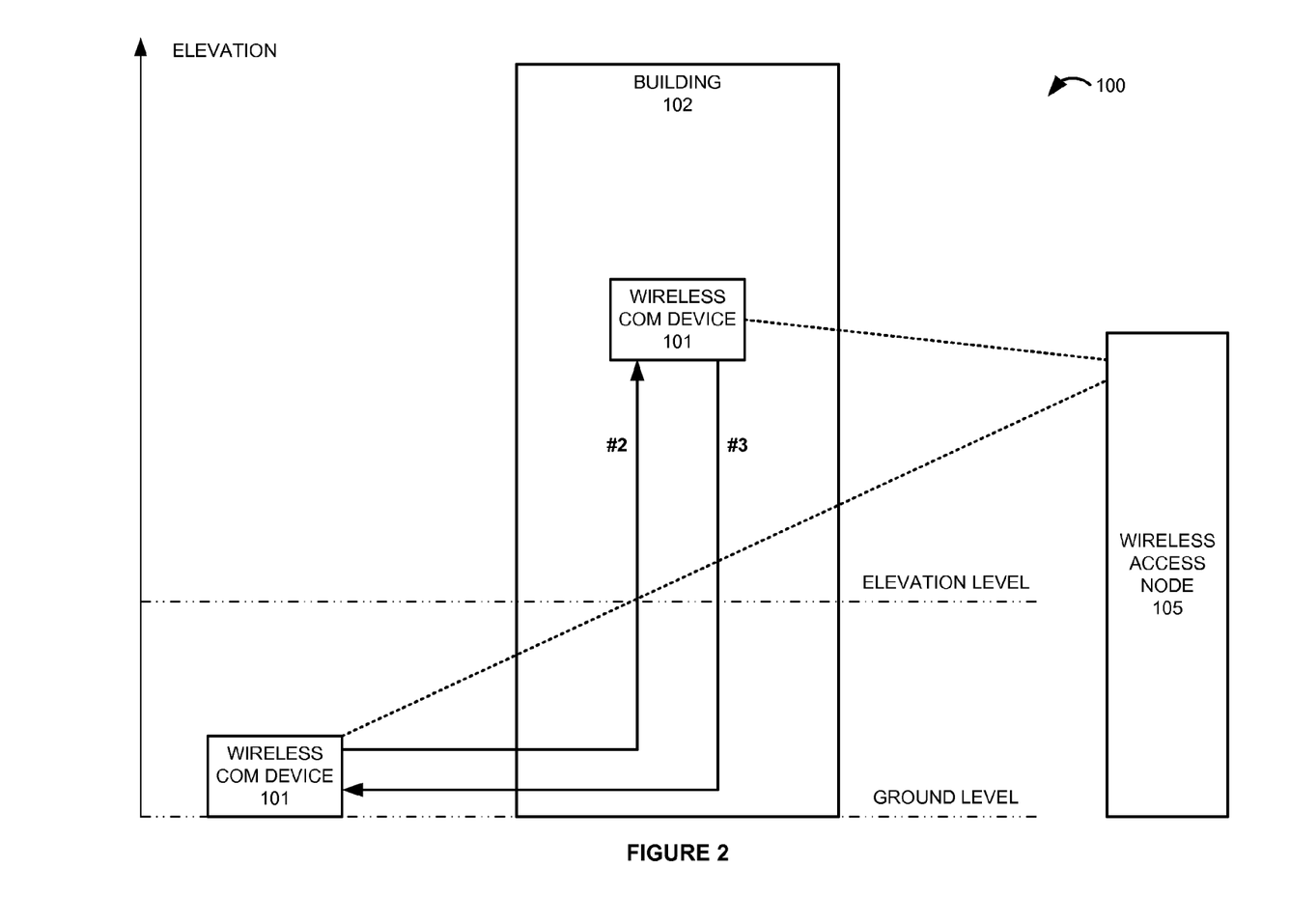
FIG. 2 illustrates an elevation view of the communication system having the wireless communication device that is controlled based on elevation.

FIG. 2 illustrates an elevation view of communication system 100. Note the elevation axis, the ground level, and the elevation level. As wireless communication device 101 moves toward the top of building 102, its received signal strength rises correspondingly. Based on location and signal strength, wireless communication device 101 estimates that is above the elevation level in building 102. Based on handover history, wireless communication device 101 determines that a handover away from wireless access node 105 is unlikely. Thus, the condition is met where wireless communication device 101 appears to be elevated and stationary within building 102.

In response to this condition, wireless communication device 101 inhibits handovers. The inhibition of handovers helps to conserve battery by reducing scanning attempts and handover-related messaging. The inhibition of handovers also avoids sudden but unwanted handovers that can occur at elevation where the power of distant signals can temporarily surge and fade. When wireless communication device 101 leaves building 102, the handover inhibition is removed, and device 101 returns to ground-level operations.

In some examples, wireless communication device 101 performs other actions in response to detecting the elevated and stationary condition. For example, wireless communication device could select a different frequency band, Walsh code, wireless protocol, or user application in response to the elevated and stationary condition.

Figure 3:
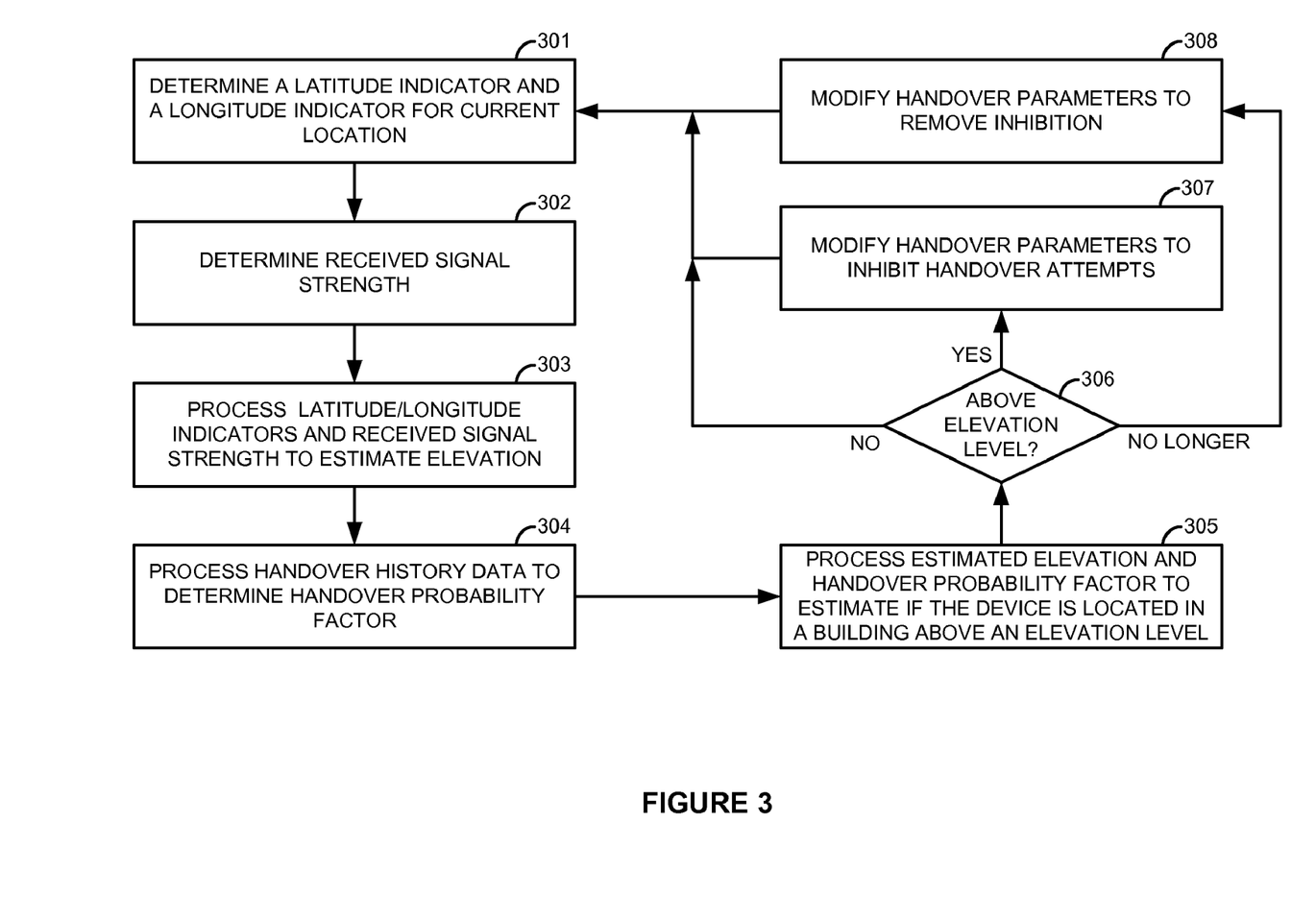
FIG. 3 illustrates the operation of a wireless communication device to implement elevation-based control by inhibiting handovers.

FIG. 3 illustrates the operation of a wireless communication device to implement elevation-based control by inhibiting handovers. The wireless communication device determines a latitude indicator and a longitude indicator for its current location (301). Various location techniques could be used, such as radio triangulation by signal strength and/or round trip delay, GPS signal processing, position beacon signal processing, or some other location-determination technique. The indicators could be geophysical coordinates, coordinate ranges, or some other information that corresponds to the current latitude/longitude of the wireless communication device.

The wireless communication device also determines received signal strength for its current location (302). The received signal strength could be measured by received signal power, signal-to-noise ratio, or some other metric that corresponds to the received signal strength. The wireless communication device processes the latitude indicators, the longitude indicators, and the received signal strength to estimate its current elevation (303). Although various techniques could be used, the wireless communication device may enter a data structure with the latitude and longitude indicators to access translation data that correlates signal strength to elevation for that location. The wireless communication device would process the received signal strength against the translation data to yield the estimated elevation.

The wireless communication device processes its handover history to determine a handover probability factor (304). In some examples, the wireless communication device sets the handover probability factor to "yes" after a handover, since the device is typically mobile during a handover. The wireless communication device monitors the time since the handover, and when a time period elapses without another handover, the wireless communication device sets the handover probability factor to "no." Other data could also be considered to determine handover probability, such as a pattern of past handovers correlated to time, accelerometer and compass data, network data, or some other information that indicates handover probability.

The wireless communication device processes the estimated elevation and the handover probability factor to estimate if the wireless communication device is located in a building above an elevation level (305). Typically, this entails identifying that wireless communication device 101 is above a specific elevation level at the location, and then waiting for the handover probability to go negative—indicating that that the wireless communication device is relatively stationary at the elevation level.

If the wireless communication device estimates that it is located within a building above its elevation level (306), then the device modifies a handover parameter to inhibit handover attempts (307). If the wireless communication device estimates that it is no longer located within the building above the elevation level (306), then the device modifies the handover parameter to remove the inhibition on handover attempts (308).

To inhibit handovers, the wireless communication device may increase the signal strength difference that is required for a handover to a new wireless access node. In some examples, wireless communication device 101 increases a time delay that is required before a handover to a new wireless access node. In some examples, the wireless communication device increases a time period between scans for other wireless access nodes. The inhibition is removed by returning these metrics to their previous settings.

Figure 4:
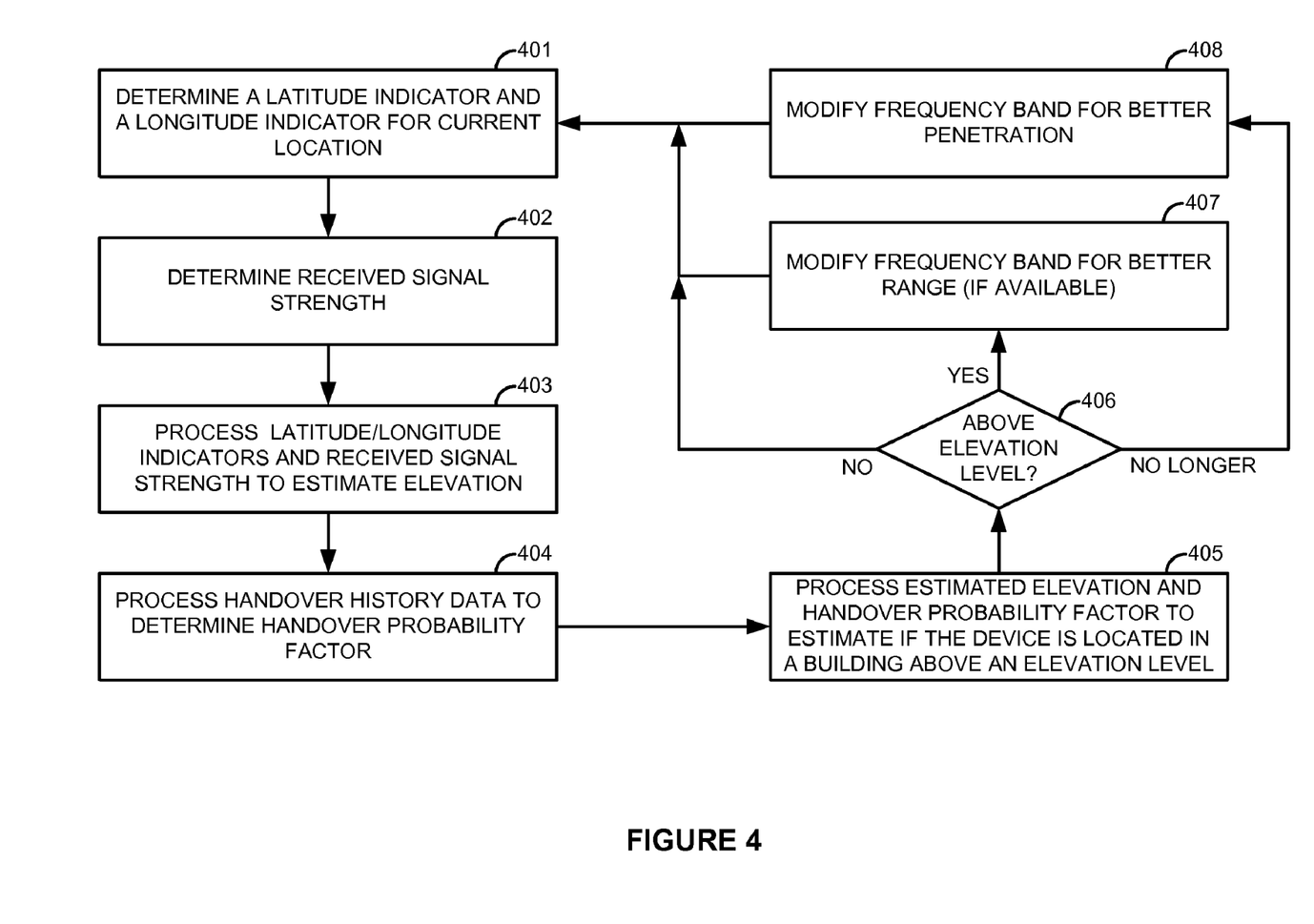
FIG. 4 illustrates the operation of a wireless communication device to implement elevation-based control by modifying frequency bands.

FIG. 4 illustrates the operation of a wireless communication device to implement elevation-based control by modifying frequency bands. The wireless communication device determines a latitude indicator and a longitude indicator for its current location (401). Various location techniques could be used, such as radio triangulation by signal strength and/or round trip delay, GPS signal processing, position beacon signal processing, or some other location-determination technique. The indicators could be geophysical coordinates, coordinate ranges, or some other information that corresponds to the current latitude/longitude of the wireless communication device.

The wireless communication device also determines received signal strength for its current location (402). The received signal strength could be measured by received signal power, signal-to-noise ratio, or some other metric that corresponds to the received signal strength. The wireless communication device processes the latitude indicators, the longitude indicators, and the received signal strength to estimate its current elevation (403). Although various techniques could be used, the wireless communication device may enter a data structure with the latitude and longitude indicators to access translation data that correlates signal strength to elevation for that location. The wireless communication device would process the received signal strength against the translation data to yield the estimated elevation.

The wireless communication device processes its handover history to determine a handover probability factor (404). In some examples, the wireless communication device sets the handover probability factor to "yes" after a handover, since the device is typically mobile during a handover. The wireless communication device monitors the time since the handover, and when a time period elapses without another handover, the wireless communication device sets the handover probability factor to "no." Other data could also be considered to determine handover probability, such as a pattern of past handovers correlated to time, accelerometer and compass data, network data, or some other information that indicates handover probability.

The wireless communication device processes the estimated elevation and the handover probability factor to estimate if the wireless communication device is located in a building above an elevation level (405). Typically, this entails identifying that the wireless communication device is above a specific elevation level at the location, and then waiting for the handover probability to go negative—indicating that that the wireless communication device is relatively stationary at the elevation level.

If the wireless communication device estimates that it is located within a building above its elevation level (406), then the device modifies a frequency band used for wireless communication to achieve better communication range (407). For example, the wireless communication device may switch from a 2.5 GHz band to a 700 MHz band. Since the wireless communication device is located above most ground clutter, better range is desired at the expense of clutter penetration. If the wireless communication device estimates that it is no longer located within the building above the elevation level (406), then the device modifies the frequency band used for wireless communication for better penetration (408). For example, the wireless communication device may switch back to the 2.5 GHz band from the 700 MHz band. Since the wireless communication device is again located in ground clutter, better clutter penetration is desired at the expense of communication range.

Figure 5:
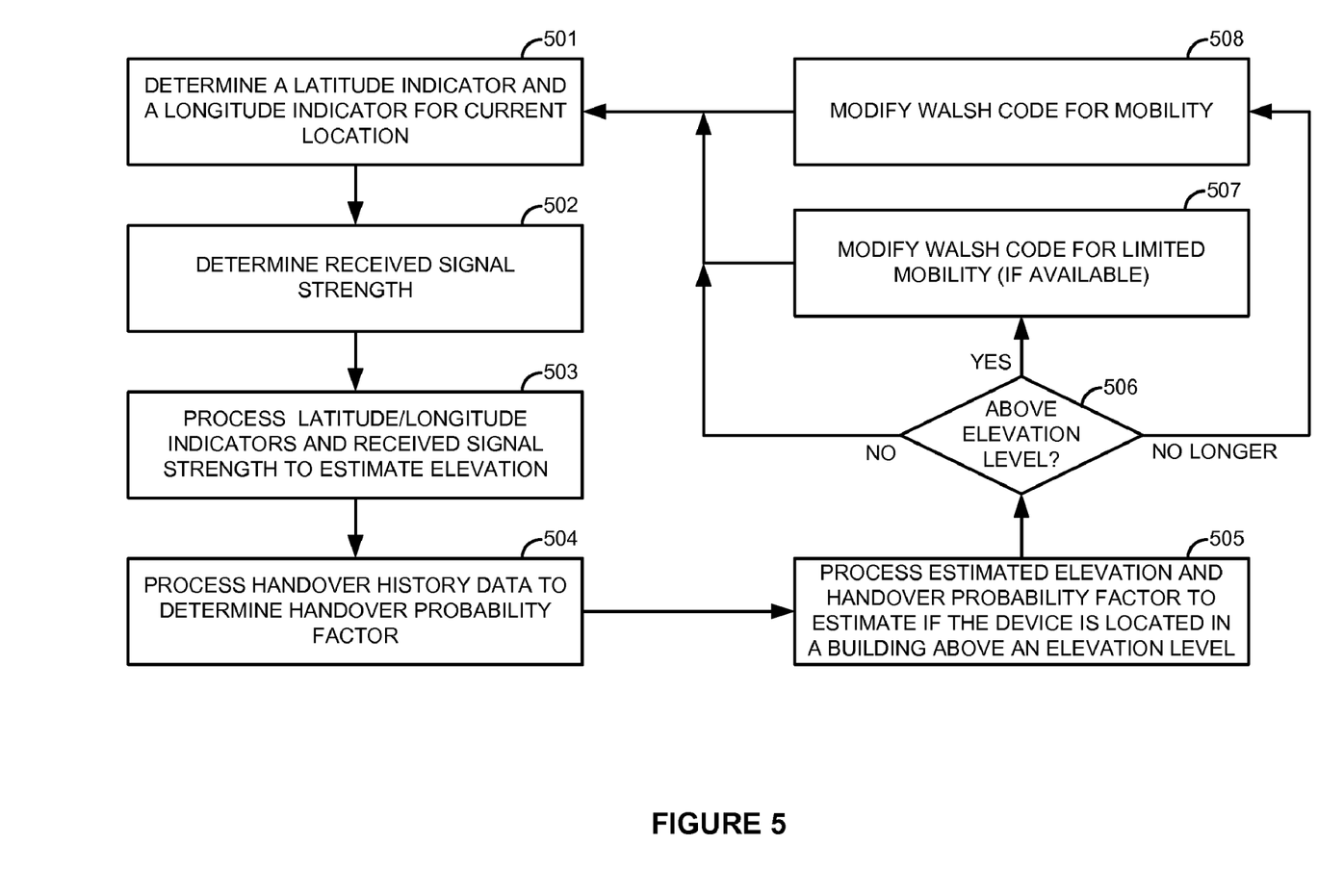
FIG. 5 illustrates the operation of a wireless communication device to implement elevation-based control by modifying Walsh codes.

FIG. 5 illustrates the operation of a wireless communication device to implement elevation-based control by modifying Walsh codes. The wireless communication device determines a latitude indicator and a longitude indicator for its current location (501). Various location techniques could be used, such as radio triangulation by signal strength and/or round trip delay, GPS signal processing, position beacon signal processing, or some other location-determination technique. The indicators could be geophysical coordinates, coordinate ranges, or some other information that corresponds to the current latitude/longitude of the wireless communication device.

The wireless communication device also determines received signal strength for its current location (502). The received signal strength could be measured by received signal power, signal-to-noise ratio, or some other metric that corresponds to the received signal strength. The wireless communication device processes the latitude indicators, the longitude indicators, and the received signal strength to estimate its current elevation (503). Although various techniques could be used, the wireless communication device may enter a data structure with the latitude and longitude indicators to access translation data that correlates signal strength to elevation for that location. The wireless communication device would process the received signal strength against the translation data to yield the estimated elevation.

The wireless communication device processes its handover history to determine a handover probability factor (504). In some examples, the wireless communication device sets the handover probability factor to "yes" after a handover, since the device is typically mobile during a handover. The wireless communication device monitors the time since the handover, and when a time period elapses without another handover, the wireless communication device sets the handover probability factor to "no." Other data could also be considered to determine handover probability, such as a pattern of past handovers correlated to time, accelerometer and compass data, network data, or some other information that indicates handover probability.

The wireless communication device processes the estimated elevation and the handover probability factor to estimate if the wireless communication device is located in a building above an elevation level (505). Typically, this entails identifying that the wireless communication device is above a specific elevation level at the location, and then waiting for the handover probability to go negative—indicating that that the wireless communication device is relatively stationary at the elevation level.

If the wireless communication device estimates that it is located within a building above its elevation level (506), then the device modifies a Walsh code that is used for wireless communication to a code that is suitable for restricted mobility (507). For example, the wireless communication device may switch to a weaker Walsh code that is operative under the restricted mobility condition. Since the wireless communication device has limited mobility in the building, the better Walsh codes can be reserved for more mobile users outside of the building. If the wireless communication device estimates that it is no longer located within the building above the elevation level (506), then the device modifies the Walsh code used for wireless communication to a code more suitable for full mobility (508).

Figure 6:
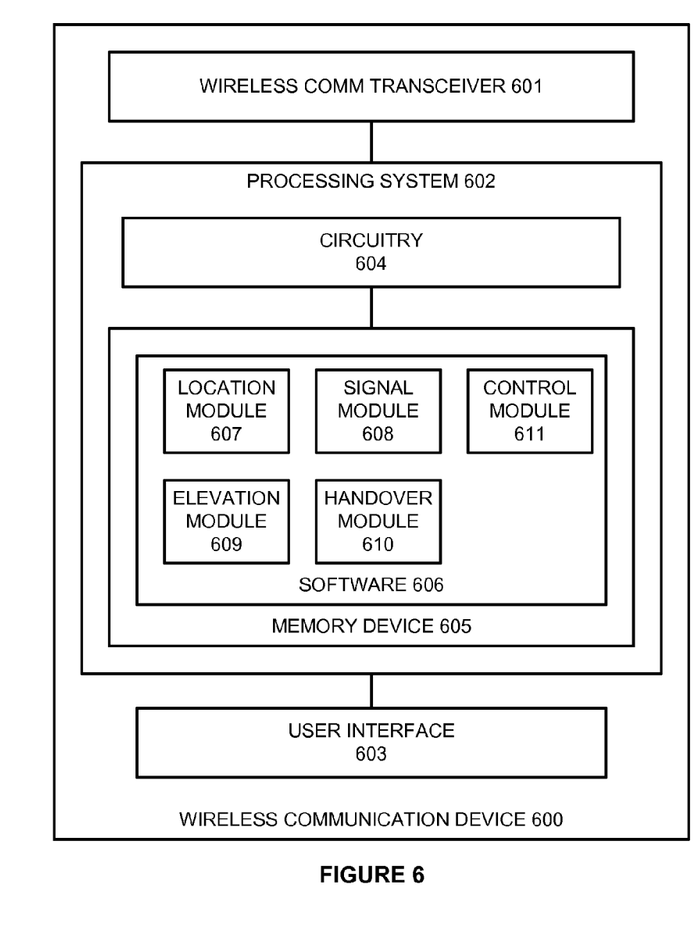
FIG. 6 illustrates a wireless communication device to implement elevation-based control

FIG. 6 illustrates the wireless communication device 600 to implement elevation-based control. Wireless communication device 600 provides an example of wireless communication device 101 or the devices of FIGS. 3-5, although these devices could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory device 605 that stores operating software 606. Operating software 606 comprises software modules 607-611. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory device, software, processing circuitry, or some other communication device. Wireless communication transceiver 601 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. In addition to wireless signal exchange, wireless communication transceiver 601 is configured to determine received signal strength and round trip delay for multiple wireless access nodes.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-611, although software 606 could have alternative configurations in some examples.

When executed by processing circuitry 604, operating software 606 directs processing system 602 to operate wireless communication device 600 as described herein for elevation-based control. In particular, location module 607 determines latitude and longitude indicators based on round trip delay measurements to multiple wireless access nodes with known locations. Signal module 608 obtains received signal strength measurements from transceiver 601. Elevation module 609 estimates the elevation based on the latitude/longitude indicators and the received signal strength. Handover module 610 determines a handover probability factor by tracking the time since the last handover. The handover probability factor is positive right after a hand off. After a set period of time elapses without a handover, then the handover probability factor goes negative.

Control module 611 processes the elevation and the handover probability to detect when device 600 appears to be stationary toward the top of a large building. Control module 611 changes parameters to inhibit handover attempts if this condition is detected. Control module 611 changes parameters to remove the handover inhibition attempts when this condition is no longer detected. In some examples, control module 611 changes frequency bands or Walsh codes if this condition is detected, and changes when this condition is no longer detected.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access nodes.

Wireless access nodes 103-105 comprise RF communication circuitry and an antenna. The RF communication circuitry typically includes an amplifier, filter, RF modulator, and signal processing circuitry. Wireless access nodes 103-105 may also comprise a router, server, memory device, software, processing circuitry, cabling, power supply, network communication interface, structural support, or some other communication apparatus. Wireless access nodes 103-105 could comprise a base station, Internet access node, telephony service node, wireless data access node, or some other wireless communication system—including combinations thereof. Wireless network protocols that may be utilized by wireless access nodes 103-105 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless access nodes 103-105 are coupled to a communication network that typically includes routers, gateways, telecommunication switches, servers, processing systems, or other communication equipment and systems for providing communication and data services. The communication network could comprise wireless communication nodes, telephony switches, Internet routers, network gateways, computer systems, communication links, or some other type of communication equipment—including combinations thereof. The communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. The communication network may be configured to communicate over metallic, wireless, or optical links. The communication network may be configured to use time-division multiplexing (TDM), Internet Protocol (IP), Ethernet, optical networking, wireless protocols, communication signaling, or some other communication format—including combinations thereof.

The wireless links (dotted lines) use the air or space as the transport medium. The wireless links may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. The wireless links may comprise many different signals sharing the same link. For example, a wireless communication link could include multiple signals operating in a single propagation path comprising multiple communication sessions, frequencies, timeslots, transportation ports, logical transportation links, network sockets, IP sockets, packets, or communication directions—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
    determining a latitude indicator and a longitude indicator for a current location of the wireless communication device;
    determining a received signal strength at the current location of the wireless communication device;
    processing the latitude indicator, the longitude indicator, and the received signal strength to estimate an elevation for the wireless communication device;
    processing handover history data for the wireless communication device to determine a handover probability factor for the wireless communication device;
    processing the estimated elevation and the handover probability factor to estimate if the wireless communication device is located in a building above an elevation level; and
    if the estimate indicates that the wireless communication device is located within the building above the elevation level, then modifying a handover parameter to inhibit a handover attempt for the wireless communication device.

2. The method of claim 1 wherein modifying the handover parameter to inhibit the handover attempt comprises increasing a signal strength difference required for the handover attempt.

3. The method of claim 1 further comprising, if the estimate indicates that the wireless communication device is no longer located within the building above the elevation level, then modifying the handover parameter to remove the inhibition.

4. The method of claim 3 wherein modifying the handover parameters remove the inhibition comprises decreasing a signal strength difference required for the handover attempt.

5. The method of claim 1 further comprising, if the estimate indicates that the wireless communication device is located within the building above the elevation level, then modifying a frequency band used by the wireless communication device.

6. The method of claim 5 wherein modifying the frequency band comprises using a new frequency band having better range than a previous frequency band.

7. The method of claim 1 further comprising, if the estimate indicates that the wireless communication device is no longer located within the building above the elevation level, then modifying the frequency band used by the wireless communication device.

8. The method of claim 7 wherein modifying the frequency band comprises using a new frequency band having better penetration than a previous frequency band.

9. The method of claim 1 further comprising, if the estimate indicates that the wireless communication device is located within the building above the elevation level, then modifying a Walsh code configuration used by the wireless communication device.

10. The method of claim 1 further comprising, if the estimate indicates that the wireless communication device is no longer located within the building above the elevation level, then modifying a Walsh code configuration used by the wireless communication device.

11. A wireless communication device comprising:
    a location processing system configured to determine a latitude indicator and a longitude indicator for a current location of the wireless communication device;
    a signal processing system configured to determine a received signal strength at the current location of the wireless communication device;
    an elevation processing system configured to process the latitude indicator, the longitude indicator, and the received signal strength to estimate an elevation for the wireless communication device;
    a handover processing system configured to process handover history data for the wireless communication device to determine a handover probability factor for the wireless communication device; and
    a communication control system configured to process the estimated elevation and the handover probability factor to estimate if the wireless communication device is located in a building above an elevation level, and if the estimate indicates that the wireless communication device is located within the building above the elevation level, then to modify a handover parameter to inhibit a handover attempt for the wireless communication device.

12. The wireless communication device of claim 11 wherein the communication control system is configured to inhibit the handover attempt by increasing a signal strength difference required for the handover attempt.

13. The wireless communication device of claim 11 wherein the communication control system is configured, if the estimate indicates that the wireless communication device is no longer located within the building above the elevation level, to modify the handover parameter to remove the inhibition.

14. The wireless communication device of claim 13 wherein the communication control system is configured to remove the inhibition by decreasing a signal strength difference required for the handover attempt.

15. The wireless communication device of claim 11 wherein the communication control system is configured, if the estimate indicates that the wireless communication device is located within the building above the elevation level, to modify a frequency band used by the wireless communication device.

16. The wireless communication device of claim 15 wherein the communication control system is configured to use a new frequency band having better range than a previous frequency band.

17. The wireless communication device of claim 11 wherein the communication control system is configured, if the estimate indicates that the wireless communication device is no longer located within the building above the elevation level, to modify the frequency band used by the wireless communication device.

18. The wireless communication device of claim 17 wherein the communication control system is configured to use a new frequency band having better penetration than a previous frequency band.

19. The wireless communication device of claim 11 wherein the communication control system is configured, if the estimate indicates that the wireless communication device is located within the building above the elevation level, to modify a Walsh code configuration used by the wireless communication device.

20. The wireless communication device of claim 11 wherein the communication control system is configured, if the estimate indicates that the wireless communication device is no longer located within the building above the elevation level, to modify a Walsh code configuration used by the wireless communication device.

* * * * *